United States Patent
Ito et al.

(10) Patent No.: US 10,071,655 B2
(45) Date of Patent: Sep. 11, 2018

(54) VEHICLE BODY STRUCTURE

(71) Applicant: HONDA MOTOR CO., LTD., Tokyo (JP)

(72) Inventors: Masamoto Ito, Wako (JP); Martin Petersson, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 15/235,672

(22) Filed: Aug. 12, 2016

(65) Prior Publication Data

US 2017/0043680 A1 Feb. 16, 2017

(30) Foreign Application Priority Data

Aug. 14, 2015 (JP) ................. 2015-160115

(51) Int. Cl.
| | |
|---|---|
| *B60J 7/00* | (2006.01) |
| *B60N 2/01* | (2006.01) |
| *B60K 15/063* | (2006.01) |
| *B60R 21/13* | (2006.01) |
| *B62D 21/04* | (2006.01) |
| *B62D 1/02* | (2006.01) |
| *B62D 29/00* | (2006.01) |
| *B62D 21/18* | (2006.01) |

(52) U.S. Cl.
CPC ............ *B60N 2/012* (2013.01); *B60K 15/063* (2013.01); *B60R 21/13* (2013.01); *B62D 1/02* (2013.01); *B62D 21/04* (2013.01); *B62D 21/183* (2013.01); *B62D 29/008* (2013.01); B60K 2015/0636 (2013.01)

(58) Field of Classification Search
CPC ........ B29C 66/71; B62D 1/184; B62D 25/04; H01L 2924/00; A61B 2046/236; H05K 7/1497; H05K 7/20745; H05K 7/20836; H05K 7/20736; G06F 1/20
USPC ........................................ 296/193.03
See application file for complete search history.

(56) References Cited

U.S. PATENT DOCUMENTS

| | | | | |
|---|---|---|---|---|
| 2,079,218 A | * | 5/1937 | Ledwinka | B60K 5/02 180/291 |
| 2,128,930 A | * | 9/1938 | Fageol | B62D 47/003 180/11 |
| 3,202,451 A | * | 8/1965 | Auger | B62D 21/10 296/204 |
| 3,703,106 A | * | 11/1972 | Arntson | B62D 1/195 74/492 |
| 4,045,075 A | * | 8/1977 | Pulver | B62D 21/08 280/798 |
| 4,217,970 A | * | 8/1980 | Chika | B60G 21/055 180/298 |
| 4,274,646 A | * | 6/1981 | Olligschlager | B62D 25/145 280/779 |

(Continued)

FOREIGN PATENT DOCUMENTS

JP 3072295 B1 7/2000

*Primary Examiner* — Kiran B Patel
(74) *Attorney, Agent, or Firm* — Westerman, Hattori, Daniels & Adrian, LLP (57) ABSTRACT

A body structure includes: a center frame extending in the longitudinal direction of the vehicle at the center in the vehicle width direction; and at least one support member extending toward the outer side in the vehicle width direction from the center frame. The support member supports at least one of a steering system, a pedal system, a seat, and a footrest member.

12 Claims, 5 Drawing Sheets

(56) References Cited

U.S. PATENT DOCUMENTS

| | | | | |
|---|---|---|---|---|
| 4,453,763 A * | 6/1984 | Richards | B62D 29/001 | 180/215 |
| 4,625,825 A * | 12/1986 | Ethier | B62D 61/065 | 180/215 |
| 5,082,311 A * | 1/1992 | Melotik | B62D 1/195 | 188/371 |
| 5,181,435 A * | 1/1993 | Khalifa | B62D 1/195 | 248/900 |
| 5,489,121 A * | 2/1996 | Mohr | B42D 17/00 | 108/44 |
| 6,460,918 B1 * | 10/2002 | Sato | B62D 21/152 | 296/193.06 |
| 6,688,676 B1 * | 2/2004 | Sato | B62D 21/152 | 296/187.05 |
| 6,705,667 B1 * | 3/2004 | Bartesch | B62D 21/10 | 296/181.7 |
| 6,755,461 B2 * | 6/2004 | Seksaria | B60K 5/12 | 296/193.04 |
| 6,786,536 B2 * | 9/2004 | Stoffels | B62D 21/11 | 180/232 |
| 6,926,351 B2 * | 8/2005 | Telehowski | B62D 23/005 | 296/193.04 |
| 7,025,412 B2 * | 4/2006 | Nakamura | B62D 21/157 | 296/193.07 |
| 7,210,723 B2 * | 5/2007 | Sugawara | B60R 7/06 | 224/483 |
| 7,258,395 B2 * | 8/2007 | Bataille | B62D 21/183 | 296/203.01 |
| 7,461,864 B2 * | 12/2008 | Ervin | B62D 21/08 | 180/298 |
| 7,510,235 B2 * | 3/2009 | Kobayashi | B60N 3/06 | 296/181.2 |
| 7,866,431 B2 * | 1/2011 | Ito | B62J 1/28 | 180/219 |
| 7,896,421 B2 * | 3/2011 | Kosuge | B62D 31/003 | 296/193.07 |
| 7,950,725 B2 * | 5/2011 | Murakami | E02F 9/163 | 296/190.03 |
| 8,047,557 B2 * | 11/2011 | Kobayashi | B62D 25/2009 | 280/124.134 |
| 8,091,657 B2 * | 1/2012 | Dieter | B60B 3/142 | 180/291 |
| 8,118,129 B2 * | 2/2012 | Ito | B60K 1/04 | 180/220 |
| 8,382,125 B2 * | 2/2013 | Sunsdahl | B62D 21/183 | 180/233 |
| 8,449,024 B2 * | 5/2013 | Pietroni | B62D 29/046 | 296/204 |
| 8,585,088 B1 * | 11/2013 | Kaku | B62D 21/06 | 280/756 |
| 8,840,131 B1 * | 9/2014 | Calley | B62D 61/065 | 180/210 |
| 8,998,255 B1 * | 4/2015 | Shinbori | B60N 2/01 | 280/756 |
| 9,150,182 B1 * | 10/2015 | Schlangen | B60G 3/20 | |
| 9,434,244 B2 * | 9/2016 | Sunsdahl | B60K 5/00 | |
| 9,764,768 B1 * | 9/2017 | Hokes | B60R 21/13 | |
| 9,771,112 B2 * | 9/2017 | Spindler | B62D 23/005 | |
| 9,789,909 B2 * | 10/2017 | Erspamer | B62D 23/005 | |
| 2011/0298189 A1 * | 12/2011 | Schneider | B60J 5/0487 | 280/80.1 |
| 2014/0124279 A1 * | 5/2014 | Schlangen | B60G 3/20 | 180/68.4 |
| 2014/0224561 A1 * | 8/2014 | Shinbori | B60G 3/20 | 180/253 |
| 2014/0353956 A1 * | 12/2014 | Bjerketvedt | B60N 3/06 | 280/756 |
| 2015/0274120 A1 * | 10/2015 | Hayashi | B60R 22/18 | 280/771 |
| 2016/0090057 A1 * | 3/2016 | Hirooka | B60R 21/13 | 296/190.03 |
| 2017/0043680 A1 * | 2/2017 | Ito | B60N 2/012 | |

* cited by examiner

VEHICLE BODY STRUCTURE

CROSS-REFERENCE OF RELATED APPLICATIONS

This application claims priority of Japanese Patent Application No. 2015-160115 filed in Japan on Aug. 14, 2015, the entire contents of which are incorporated herein by reference.

TECHNICAL FIELD

The present invention relates to a vehicle body structure.

BACKGROUND OF THE INVENTION

Figure 5A:
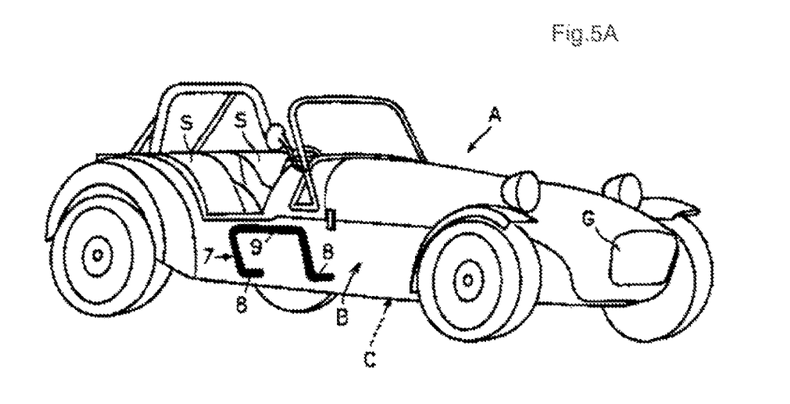
Figure 5B:
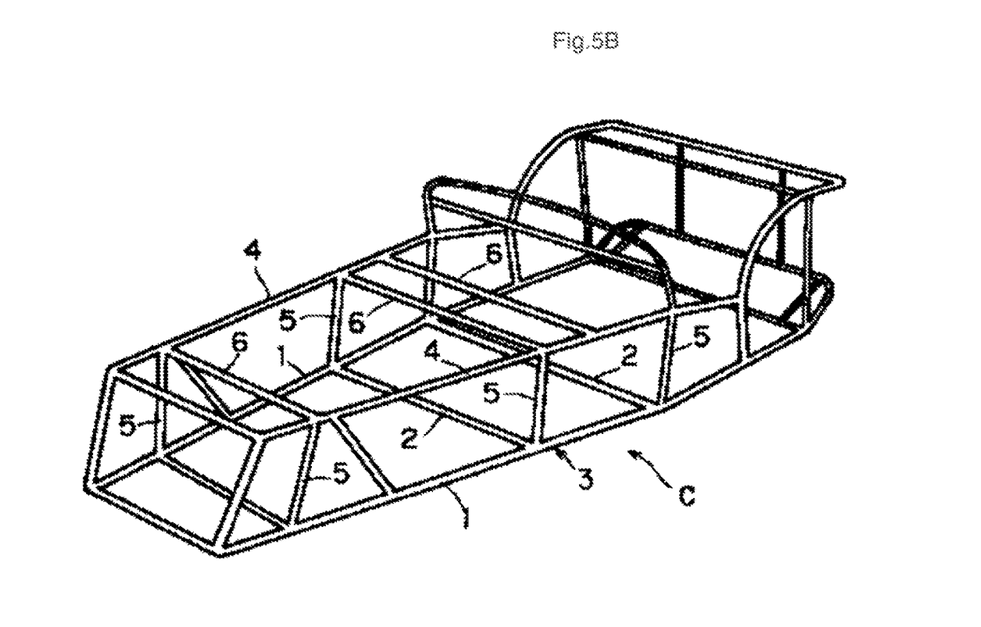

As an open two-seater car, Japanese Patent No. 3072295 describes a vehicle shown in part (A) of FIG. 5, for example. As shown in part (B) of FIG. 5, the body structure of such a conventional vehicle is formed into a basket shape, and includes a ladder frame 3 formed of base frames 1, 1 extending in the longitudinal direction, and a pair of horizontal frames 2, 2 laid across and connecting the base frames 1, 1, and spaced apart in the longitudinal direction.

Since the framework of the body structure shown in part (B) of FIG. 5 is configured of a basket-shaped frame, a twist is likely to occur in the vehicle body. This reduces the occupant's direct feel of acceleration during acceleration of the vehicle, for example. Also, since the basket-shaped frame is configured of multiple frames, its manufacturing process becomes complex, and manufacturing cost increases.

SUMMARY OF THE INVENTION

Hence, an objective of the present invention is to provide a body structure that can reduce the number of parts, and also improve stiffness to give the occupant a direct feel of acceleration like an automobile.

According to the present invention, there is provided a body structure including: a center frame extending in the longitudinal direction (a front-rear direction) of the vehicle at the center in the vehicle width direction; and at least one support member extending toward the outer side in the vehicle width direction from the center frame, and characterized in that the support member supports at least one of a steering system, a pedal system, a seat, and a footrest member.

According to the present invention, it is possible to provide a body structure that can reduce the number of parts, and also improve stiffness to give the occupant a direct feel of acceleration like an automobile.

BRIEF DESCRIPTION OF THE DRAWINGS

Part (A) of FIG. 5 is a perspective view of a vehicle adopting a conventional body structure, and part (B) of FIG. 5 is a perspective view of the conventional body structure.

DETAILED DESCRIPTION OF THE INVENTION

First Embodiment

Vehicle 1

Figure 1:
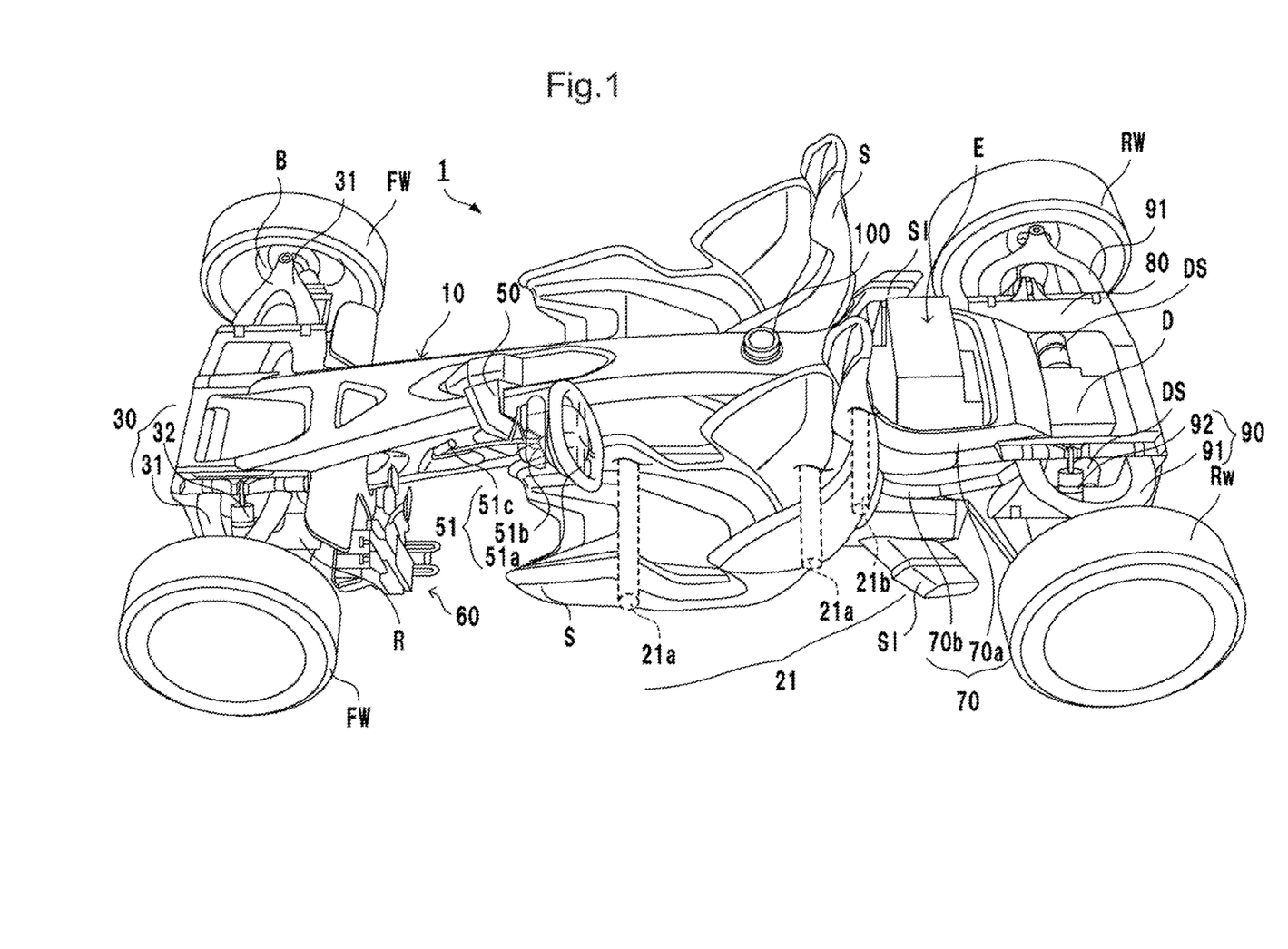
FIG. 1 is a perspective view of a vehicle adopting a body structure of a first embodiment of the present invention.
Figure 2:
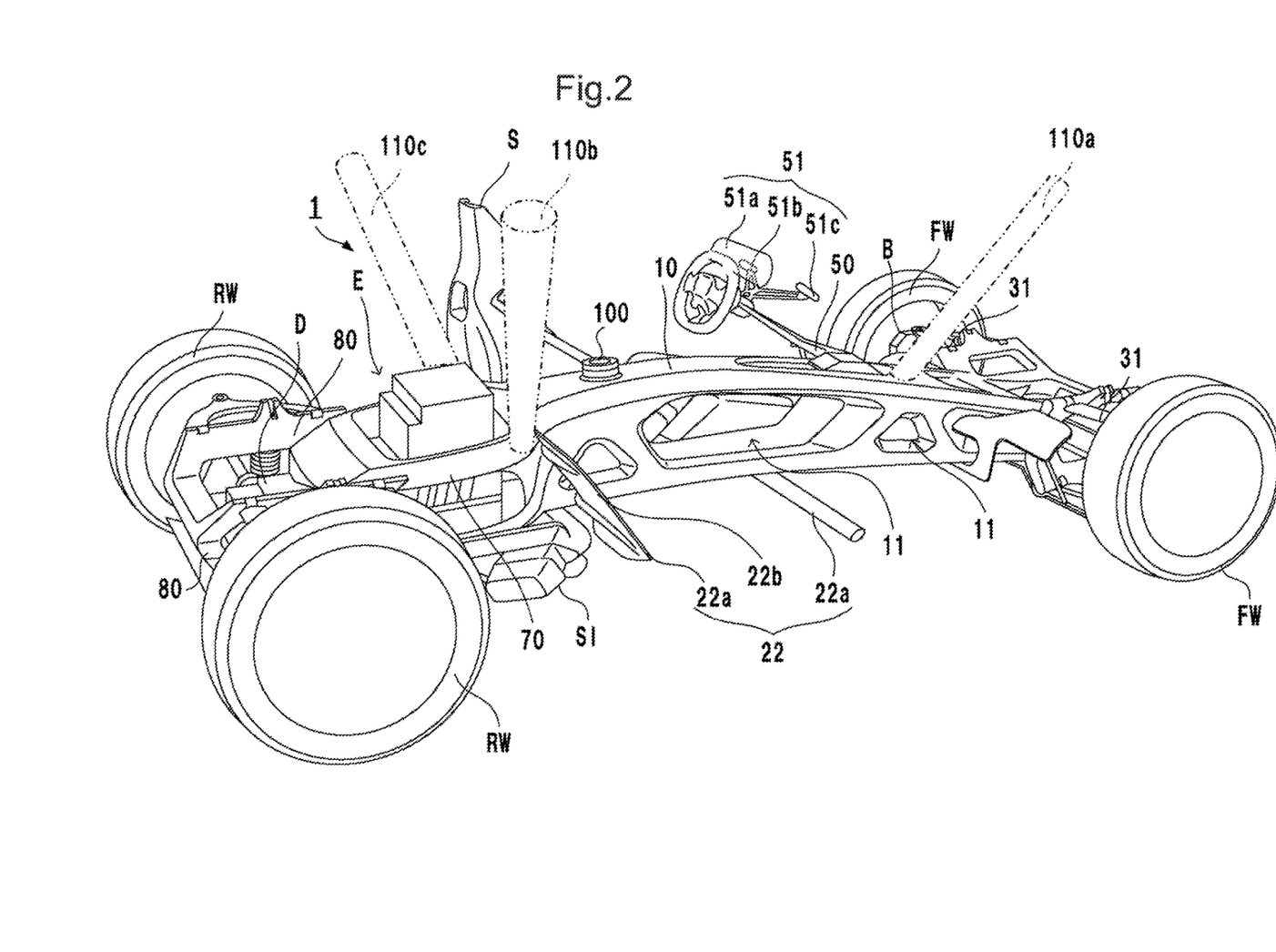
FIG. 2 is a perspective view of the vehicle adopting the body structure of the first embodiment of the present invention.
Figure 3:
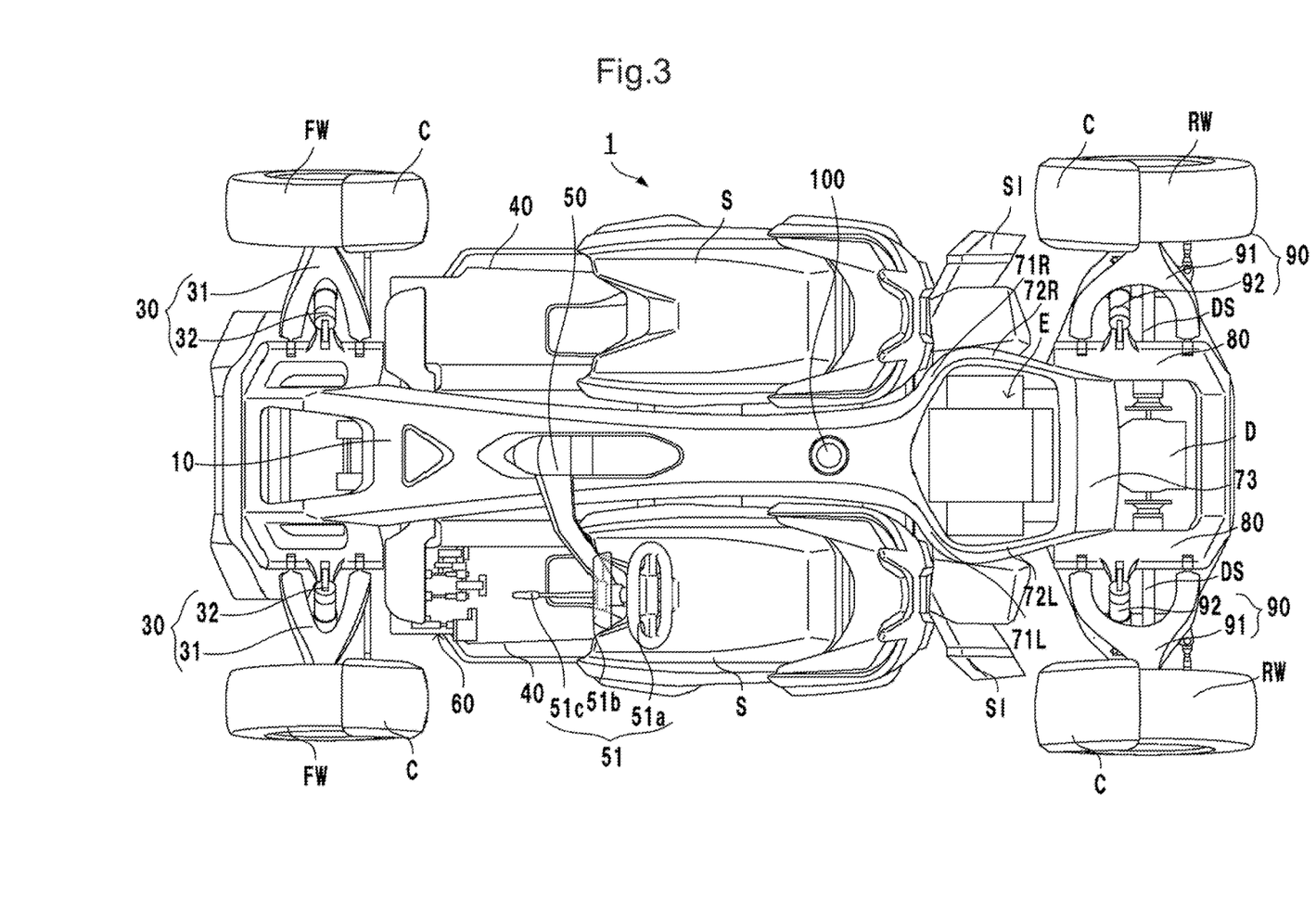
FIG. 3 is a plan view of the vehicle adopting the body structure of the first embodiment of the present invention.

FIGS. 1 to 3 show a vehicle 1 including a body structure of a first embodiment of the present invention. In the following description, the right side of the vehicle when viewing the vehicle from the rear is referred to as the right, and the left side of the vehicle from the same viewpoint is referred to as the left. Note that although a left hand drive car is used as an example in the embodiment, the invention is not limited to this, and is applicable to a right hand drive car. FIG. 1 is a perspective view of the vehicle 1, as viewed from above the driver's seat side (left). FIG. 2 is a perspective view of the vehicle 1 as viewed from the obliquely rear upper direction of the passenger's seat side (right), when the passenger's seat is detached. FIG. 3 is a plan view of the vehicle 1, as viewed from above. Note that in the drawings, some parts to be attached to the vehicle are omitted or added for the sake of clarity of the description.

The vehicle 1 of the embodiment exemplifies a four wheel car, which is two-wheeled at the front and two-wheeled at the rear. Note that the body structure of the embodiment is not limited to a four wheel car, and is applicable to a three wheel car, which is one-wheeled at the front and two-wheeled at the rear, or a vehicle including more than four wheels.

The vehicle 1 includes a center frame 10 extending in the longitudinal direction of the vehicle at the center in the vehicle width direction, and at least one support member to be described later, which extends toward the outer side in the vehicle width direction from the center frame 10. The center frame 10 is an aluminum die casting, for example. A light and very stiff frame can be manufactured by aluminum die casting. Accordingly, fuel efficiency can be improved, and reduction in twisting of the vehicle body can give the occupant a direct feel of acceleration. Also, since the frame is cast, its manufacturing process can be shortened, and manufacturing cost can be reduced. Moreover, a space 11 (see FIG. 2) can be easily formed to penetrate space and surface inside the center frame 10 for weight reduction, so that the number of parts can be reduced significantly, as compared to a monocoque structure.

In a vehicle front part of the center frame front wheels FW are connected to the right and left in the vehicle width direction, through double wishbone suspension systems 30, for example. The suspension system 30 at least includes an arm 31 and a suspension 32. In addition, the front wheel FW includes a brake B and a tie rod R of a steering system 51 connected thereto, and is operated by a later mentioned pedal system 60 and steering system 51 to be used for braking and steering of the vehicle 1. Note that the suspension system 30 is not limited to the above double wishbone type, and a swing arm type, strut type, multi-link type, or rigid type may be adopted.

Support Members 21, 22

A first support member 21 extending to the driver's seat side (left of vehicle, one side) on the outer side in the vehicle width direction from the center frame 10, and a second support member 22 extending to the passenger's seat side (right of vehicle, other side) are arranged at the center in the longitudinal direction of the vehicle 1. A seat S is supported to each of the first support member 21 and the second support member 22. A two-seater structure can be formed easily, by thus supporting the seats S by the first and second support members 21, 22 extending to opposite directions from the center frame 10. As illustrated in detail in FIG. 2, the second support member 22 includes two lower second support members 22a extending from lower parts of the center frame 10, and a middle second support member 22b arranged on the backrest side of the seat S. Note that as in the case of the second support member 22, the first support member 21 includes two lower first support members 21a extending from lower parts of the center frame 10, and a middle first support member 21b arranged on the backrest side of the seat S as indicated by a chain line in FIG. 1. Also, the lower first support members 21a and lower second support members 22a, and the middle first support member 21b and middle second support member 22b may penetrate the center frame 10 and be connected to each other as one body.

Seat S

As the seat S, a form is exemplified in which the occupant can stretch his/her legs frontward while being seated, and which includes a backrest and a headrest for supporting the back and head part. Note that this structure is different from a seat of a straddle type vehicle, which the occupant rides by straddling the body structure at the center in the vehicle width direction. In the embodiment, the second support member 22 supports the passenger's seat S in a detachable manner. With this configuration, when the driver is riding alone, the passenger's seat S can be detached to reduce weight and improve fuel efficiency.

Footrest Member 40

Also, as shown in FIG. 3, the center frame 10 includes a foot rest member 40 in front of the seat S, and below the stretched legs of the occupant. The footrest member 40 is arranged on at least one of the driver's seat side and the passenger's seat side. The foot rest member 40 can be used to rest the legs of the occupant, and prevents objects on the road from flying toward the occupant from below the vehicle body, during travel. Additionally, an unillustrated third support member and fourth support member support the footrest members 40. A third support member (not shown) extending to the driver's seat side (left of vehicle, one side) on the outer side in the vehicle width direction of the center frame 10, and a fourth support member (not shown) extending to the passenger's seat side (right of vehicle, other side), may be adopted as the third support member and fourth support member.

Since the third and fourth support members are configured to support the footrest members 40, comfort in riding can be improved, and weight and the number of parts can be reduced. Note that as concrete forms of the third and fourth support members, integrated flat plates formed into under covers may be arranged on a lower surface of the vehicle, or the first support member 21 and second support member 22 may serve as the third and fourth support members, respectively. Furthermore, the third and fourth support members may be integrated with the footrest members 40, and be attached to the center frame 10. Note that the footrest member 40 on the driver's seat side may be omitted as appropriate, since the driver's feet are placed on the later mentioned pedal system 60.

Steering System 51

Referring back to FIG. 1, a fifth support member 50, which extends to the driver's seat side (left of vehicle, one side) on the outer side in the vehicle width direction from the center frame 10, is arranged in front of the center in the longitudinal direction of the vehicle of the center frame 10, and in front of the driver's seat S. The fifth support member 50 extends from an upper surface of the center frame 10, and supports the steering system 51 on its end portion on the outer side in the vehicle width direction, for example. The steering system 51 at least includes a handle 51a, a display 51b, and a projector 51c. Operation of the handle 51a is transmitted to the aforementioned tie rod R through a transmission mechanism, such as an unillustrated link provided inside the fifth support member 50, and steers the front wheel FW. Travel information such as vehicle speed is displayed by information projected by the projector 51c, on the display 51b. Since the fifth support member 50 supports the steering system 51, the need for a dashboard or other parts is eliminated, whereby weight and the number of parts can be reduced. Note that transmission of drive power of the steering system 51 is not limited to a mechanical transmission mechanism such as the link mentioned above, and an electronically controlled by-wire or by-light transmission mechanism may be adopted, for example.

Pedal System 60

The pedal system 60 is arranged closer to the vehicle front side than the fifth support member 50. The pedal system 60 is supported by an unillustrated support member, which extends to the driver's seat side (left of vehicle, one side) on the outer side in the vehicle width direction from a lower part of the center frame 10, for example. The pedal system 60 at least includes an acceleration pedal and a brake pedal, but may also include a footrest and a clutch pedal.

Shroud Frame 70

The center frame 10 includes a shroud frame 70 branching into parts, which extend toward the outer sides in the vehicle width direction behind the center in the longitudinal direction of the vehicle, extends to the rear of the vehicle while being spaced apart from each other for a predetermined distance, and are reconnected. The shroud frame 70 includes a front frame 71 branching from the center frame 10, a middle frame 72 extending substantially in the longitudinal direction of the vehicle, and a rear frame 73 connecting the branched middle frame 72 (see FIG. 3). Note that the front frame 71 and middle frame 72 branched to the right side in the vehicle width direction are referred to as a right front frame 71R and right middle frame 72R. Also, the front frame 71 and middle frame 72 branched to the left side in the vehicle width direction are referred to as a left front frame 71L and left middle frame 72L. A power unit E, such as an internal combustion engine, is accommodated on the inner side (inward) of the shroud frame 70 in the vehicle width direction. Hence, by adopting a frame that divides the center frame 10 into right and left parts extending toward the outer sides in the vehicle width direction, and surrounds the power unit E, the power unit E can be provided compactly inside the center frame 10. Further, since the shroud frame 70 is formed into an annular shape, stiffness required for travel can be obtained. The power unit E of the embodiment includes an unillustrated exhaust pipe and a silencer SI connected thereto. Note that the power unit E is not limited to an internal combustion engine, and an electric motor or other parts may be adopted.

Also referring to FIG. 1, the center frame 10 includes two shroud frames 70a, 70b spaced apart from each other in the vehicle height direction. This can make the two shroud frames 70a, 70b stiffer, and enable stable support of the power unit E. Additionally, traveling wind passing through between the two shroud frames 70a, 70b can cool the power unit E. Moreover, since the upper part of the upper shroud frame 70a is also open, traveling wind hits a part of the power unit E protruding from the upper part, and can cool the power unit E. Referring to FIG. 3, piping of the power unit E, such as an exhaust pipe, can be drawn out from between the two shroud frames 70a, 70b. The silencer SI of a muffler or other parts may be arranged to extend toward the outer side in the vehicle width direction, from below the lower shroud frame 70b.

Clipper-and-Lower Frame 80

The center frame 10 includes a pair of upper-and-lower frames 80 arranged in the vehicle width direction, each of the upper-and-lower frames connected to the rear of the shroud frame 70, and branching into upper and lower parts in the vehicle height direction. The upper-and-lower frame 80 of the embodiment exemplifies a form, in which frames connected to the rear frame 73 of the shroud frame 70 and rectangular in plan view are spaced apart in the vertical direction, and connected to each other. However, the upper-and-lower frame 80 is not limited to the above form, and may adopt a form including: a frame extending to the vehicle rear from the rear frame 73 of the upper shroud frame 70a; and a frame extending to the vehicle rear from the rear frame 73 of the lower shroud frame 70b. That is, the frame need not be formed into a rectangular shape in plan view.

Double wishbone suspension systems 90, for example, for suspending rear wheels RW, are respectively connected to right and left end parts in the vehicle width direction of the upper-and-lower frames 80. As in the case of the front wheel, the rear wheel RW is connected to the upper-and-lower frame 80, through an arm 91 and suspension 92 of the suspension system 90. In addition, the rear wheel RW includes the brake B, is connected to a later mentioned drive shaft DS, and receives braking of the vehicle and drive power from the power unit E, according to operation of the pedal system 60. Note that as in the case of the suspension system 30, the suspension system 90 is not limited to a double wishbone type, and other forms may be adopted.

In addition, power transmission mechanisms, such as a transmission device and differential device D connected to the power unit E, are accommodated on the inner side in the vehicle width direction of the upper-and-lower frame 80. Furthermore, a drive shaft DS extending toward the outer side in the vehicle width direction from the differential device D, is inserted between the upper and lower parts of the upper-and-lower frame 80. This can downsize the drive line, and reduce weight and the number of parts.

Fuel Tank

Also, a hollow part is provided in at least a part inside the center frame 10, and an unillustrated fuel tank is arranged in the hollow part. For example, the fuel tank may be arranged in a hollow part at the center of the center frame 10 in the vicinity of a fuel filler opening 100, which is arranged in a center part of the center frame 10, so that the fuel tank can be connected with the fuel filler opening 100. This allows the fuel tank to be arranged by utilizing space inside the center frame 10, so that the number of parts can be reduced, and the vehicle body can be downsized. Moreover, since the fuel tank is arranged at the center in the longitudinal direction of the vehicle and in the vehicle width direction, fuel leakage at the time of a frontal or rear collision, for example, can be prevented.

Protection Members 110a, 110b, 110c

The vehicle 1 of the embodiment may include protection members 110a, 110b, 110c for protecting the occupant at the time of a vehicle rollover. As indicated by a two-dot chain line in FIG. 2, the protection members 110a, 110b, 110c are arranged on an upper surface of the center frame 10, and are inflated at least higher than the height of the seat S in the vehicle height direction, at the time of a rollover. A bag-shaped bar member inflated by an explosive or other materials at the time of a rollover, such as an airbag device, may be adopted as a form of the protection member to be inflated. Additionally, the protection member may adopt a form in which multiple tubes having different inner diameters are stored in a mutually overlapping state, and when inflated, stretch while sliding relative to one another like a telescopic structure. With this configuration, the protection member inflated and developed according to need can protect the occupant, at the time of a vehicle rollover.

Further, the protection members 110a, 110b, 110c may be distributed in the longitudinal direction of the vehicle around the seat S, and be arranged in at least three locations. For example, a first protection member 110a that extends obliquely upward toward the vehicle front when inflated, may be provided in front of the fifth support member 50 supporting the steering system 51. Furthermore, a second protection member 110b and third protection member 110c extending obliquely upward toward the vehicle rear may foe adopted for each of the right and left front frames 71R, 71L of the shroud frame 70, behind the seat S. With this configuration, even at the time of a vehicle rollover, the vehicle body is supported at least at three points sandwiching the seat S in the longitudinal direction, so that the occupant can be protected.

Second Embodiment

Figure 4:
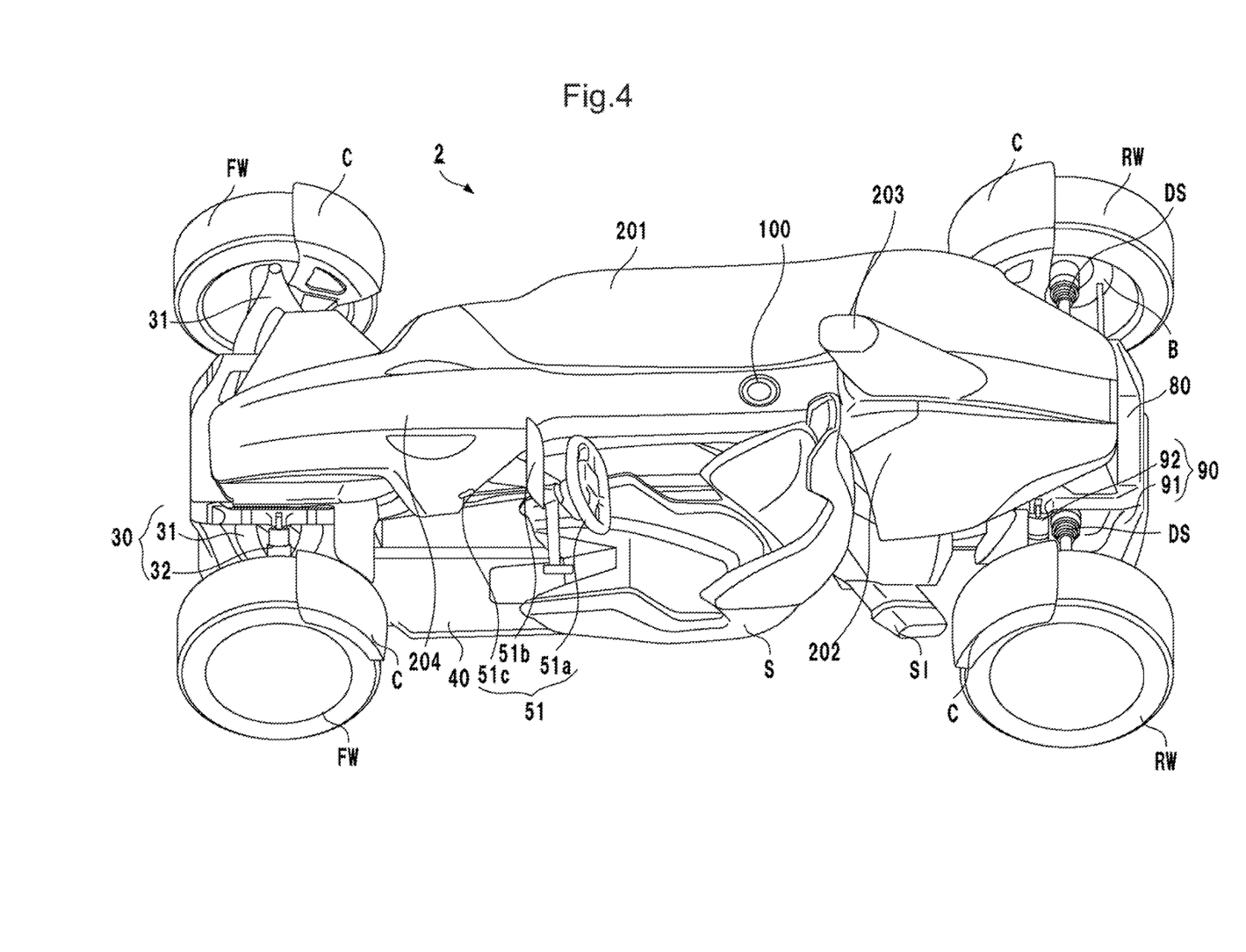
FIG. 4 is a perspective view of a vehicle adopting a body structure of a second embodiment of the present invention.

FIG. 4 shows a vehicle 2 of a second embodiment of the present invention. The embodiment includes a cowl member 201, which is arranged at least on the passenger's seat side (right of vehicle, other side) of the center frame 10 to cover a space where a passenger's seat S is provided, when the passenger's seat is detached. This can improve appearance of the whole vehicle, and can straighten traveling wind passing through the space where the passenger's seat was provided, so that aerodynamic performance can be improved.

In addition, the embodiment is not limited to the space on the passenger's seat side, and a cowl member 202 may be adopted to cover the shroud frame 70 and upper-and-lower frame 80 in the rear part of the center frame 10. Furthermore, the cowl member 202 covering an upper part of the power unit E has an induction pod 203 forming an intake passage, and an unillustrated roll bar may be provided inside the induction pod. This can protect the occupant instead of the aforementioned protection members 110a, 110b, 110c, at the time of a vehicle rollover. Moreover, a cowl member 204 arranged on an upper surface of the center frame 10, and having a shape that improves the appearance of the vehicle 1 may be adopted. Also, a mudguard cover C may be arranged on each of the front wheel FW and the rear wheel RW.

As has been described, according to the aforementioned first and second embodiments of the present invention, the support member can support at least one of the steering system 51, the pedal system 60, the seat S, and the footrest member 40. This allows the respective parts to be arranged on the support members extending from and around the center frame 10, so that reduction in the number of parts and manufacturing can be made easier, and parts can be varied easily. Moreover, it is possible to provide a four wheel car, for example, that can give a direct feel of acceleration like an automobile when driving, while also maintaining stiffness of the vehicle required for normal travel.

Summary of Embodiment

1. The body structure (such as 1) of the above embodiment includes: a center frame (such as 10) extending in the longitudinal direction of the vehicle at the center in the vehicle width direction; and at least one support member (such as 21, 22, 50) extending toward an outer side in the vehicle width direction from the center frame, and is characterized in that the support member supports at least one of a steering system (such as 51), a pedal system (such as 60), a seat (such as S), and a footrest member (such as 40).

According to this configuration, since the respective parts are arranged on the support members extending from and around the center frame, reduction in the number of parts and manufacturing can be made easier, and parts can be varied easily.

2. The body structure (such as 1) of the above embodiment includes a first support member (such as 21) extending to one side on the outer side in the vehicle width direction from the center frame (such as 10), and a second support member (such as 22) extending to the other side, and is characterized in that each of the first support member and second support member supports a seat (such as S).

According to this configuration, since the support members extending to opposite directions from the center frame support the seats, two seats can be provided easily.

3. The body structure (such as 1) of the above embodiment is characterized in that: the first support member supports a driver's seat; and the second support member supports a passenger's seat in a detachable manner.

According to this configuration, when the driver is riding alone, the passenger's seat can be detached to reduce weight and improve fuel efficiency.

4. The body structure (such as 1) of the above embodiment is characterized by further including a cowl member (such as 201) arranged at least on the other side of the center frame, when the passenger's seat is detached.

According to this configuration, since the cowl member can be provided in the passenger's seat part when the passenger's seat is detached, appearance can foe improved, and aerodynamic performance can be improved.

5. The body structure (such as 1) of the above embodiment further includes at least one of a third support member extending to one side on the outer side in the vehicle width direction from the center frame (such as 10), and a fourth support member extending to the other side, and is characterized in that each of the third support member and fourth support member supports a footrest member (such as 40).

According to this configuration, since the footrest member is arranged, comfort in riding can be improved, and weight and the number of parts can be reduced.

6. The body structure (such as 1) of the above embodiment further includes a fifth support member (such as 50) extending to one side on the outer side in the vehicle width direction from the center frame, and is characterized in that the fifth support member supports a steering system (such as 51).

According to this configuration, since the need for a dashboard or other parts is eliminated, weight and the number of parts can be reduced.

7. The body structure (such as 1) of the above embodiment is characterized in that the center frame is an aluminum die casting.

According to this configuration, since the frame is manufactured by aluminum die casting, a light and very stiff frame can be obtained. Accordingly, fuel efficiency can be improved, and reduced twisting of the vehicle body can give the occupant a direct feel of acceleration. Also, since the frame is cast, its manufacturing process can be shortened, and manufacturing cost can be reduced. Moreover, a space can be easily formed inside the center frame for weight reduction, so that the number of parts can be reduced significantly, as compared to a monocoque structure.

8. The body structure (such as 1) of the above embodiment is characterized in that: the center frame has a shroud frame (such as 70) branching into parts, which extend toward the outer sides in the vehicle width direction at a rear part in the longitudinal direction of the vehicle, extends to the rear of the vehicle while being spaced apart from each other for a predetermined distance, and are reconnected; and a power unit (such as E) is accommodated on the inner side of the shroud frame.

According to this configuration, since the center frame is divided into right and left parts extending toward the outer sides in the vehicle width direction, and surrounds and covers the power unit, the power unit can be provided compactly inside the center frame. Further, since the shroud frame is connected at the rear end, stiffness required for travel can be obtained.

9. The body structure (such as 1) of the above embodiment is characterized in that the center frame includes two of the shroud frames (such as 70a, 70b) spaced apart from each other in the vehicle height direction.

According to this configuration, traveling wind passing through between the two shroud frames can cool the power unit. Moreover, since the upper part of the shroud frame is also open, traveling wind hits a part of the power unit protruding from the upper part, and can cool the power unit. Further, piping of the power unit can be drawn out from between the two shroud frames.

10. The body structure (such as 1) of the above embodiment is characterized in that: the center frame includes a pair of upper-and-lower frames (such as 80) arranged in the vehicle width direction, each of the upper-and-lower frames connected to the rear of the shroud frame, and branching into upper and lower parts in the vehicle height direction; and a drive shaft (such as DS) is inserted between the upper and lower parts of the upper-and-lower frame.

According to this configuration, since the drive shaft is inserted through the center frame, the drive line can be downsized, and weight and the number of parts can be reduced.

11. The body structure (such as 1) of the above embodiment is characterized in that: a hollow part is provided in at least a part inside the center frame; and a fuel tank is arranged in the hollow part.

According to this configuration, the fuel tank can be arranged by utilizing space inside the center frame, so that the number of parts can be reduced, and the vehicle body can be downsized. Moreover, when the fuel tank is arranged at the center in the vehicle width direction, fuel leakage at the time of a frontal or rear collision, for example, can be prevented.

12. The body structure (such as 1) of the above embodiment includes a protection member (such as 110a, 110b, 110c) for protecting the occupant at the time of a vehicle rollover, and is characterized in that the protection member is arranged on an upper surface of the center frame (such as 10), and is inflated at least higher than the height of a seat (such as S) in the vehicle height direction, at the time of a rollover.

According to this configuration, the protection member inflated and developed according to need can protect the occupant, at the time of a vehicle rollover.

13. The body structure (such as 1) of the above embodiment is characterized in that the protection member (such as 110a, 110b, 110c) is distributed in the longitudinal direction of the vehicle around the seat, and is arranged in at least three locations.

According to this configuration, even at the time of a vehicle rollover, the vehicle body is supported at least at three points sandwiching the seat in the longitudinal direction, so that the occupant can be protected.

DESCRIPTION OF REFERENCE NUMERALS 1 body structure, 10 center frame, 20 support member, 51 steering system, 60 pedal system, S seat, 40 foot rest, member

The invention claimed is:

1. A vehicle body structure comprising:
a center frame extending in a front-rear direction of a vehicle at a center in a vehicle width direction; and
at least one support member extending toward at least one of outer sides in the vehicle width direction from the center frame, each support member having a free end which is not connected to any other parts of the center frame or other support members, wherein
the support member supports at least one of a steering system, a pedal system, at least one seat, and at least one footrest member of the vehicle.

2. The vehicle body structure according to claim 1, wherein
said at least one support member comprises a first support member extending to one side of the outer sides in the vehicle width direction from said center frame, and a second support member extending to an other side of the outer sides, wherein
each of said first support member and second support member supports one of said at least one seat.

3. The vehicle body structure according to claim 2, wherein
said first support member supports a driver's seat, and said second support member supports a passenger's seat in a detachable manner.

4. The vehicle body structure according to claim 3, further comprising a cowl member arranged at least on said other side of said center frame, when said passenger's seat is detached.

5. The vehicle body structure according to claim 2, wherein
said at least one support member further comprising another support member extending to said one side in the vehicle width direction from said center frame, wherein
said another support member supports the steering system.

6. The vehicle body structure according to claim 1, wherein
said center frame has a die-casted aluminum frame.

7. The vehicle body structure according to claim 1, wherein
said center frame at a rear side thereof has a shroud frame branching into parts which extend toward the respective outer sides in the vehicle width direction, then extend to a rear of the vehicle and join each other at the rear, thereby forming a space surrounded by the shroud frame, inside which a power unit of the vehicle is accommodated.

8. The vehicle body structure according to claim 7, wherein
said center frame at the rear side thereof has two of said shroud frames spaced apart from each other in a vehicle height direction.

9. The vehicle body structure according to claim 7, wherein
said center frame has a pair of upper-and-lower frames arranged in the vehicle width direction, each of the upper-and-lower frames being connected to a rear side of said shroud frame and branching into upper and lower parts in the vehicle height direction, thereby forming a space through which a drive shaft of the vehicle is inserted.

10. The vehicle body structure according to claim 1, wherein
said center frame has at least one hollow part formed therein inside which a fuel tank is arranged.

11. The vehicle body structure according to claim 1, further comprising a protection member for protecting an occupant of the vehicle in an event of a vehicle rollover, wherein
said protection member is arranged on an upper surface of said center frame and is configured to enlarge or extend to reach a position at least higher than a height of said at least one seat in a vehicle height direction in the event of the vehicle rollover.

12. The vehicle body structure according to claim 11, wherein
said protection member is provided to the vehicle at both sides of said at least one seat in the front-rear direction and arranged in at least three different locations in the vehicle.

* * * * *